United States Patent [19]
Dreiske

[11] 3,726,999
[45] Apr. 10, 1973

[54] TELEVISION RECEIVER CIRCUIT PROVIDING FEEDBACK FROM HORIZONTAL DRIVER TRANSFORMER TO POWER SUPPLY

[75] Inventor: Erwin J. Dreiske, Oak Park, Ill.

[73] Assignee: Warwick Electronics Inc., Chicago, Ill.

[22] Filed: Oct. 20, 1971

[21] Appl. No.: 190,985

[52] U.S. Cl........178/7.3 R, 178/DIG. 11, 307/252 F, 323/22 SC
[51] Int. Cl...............................G05f 1/56, G05f 1/64
[58] Field of Search....................178/DIG. 11, 7.3 R; 315/28, 29, 27 TD; 317/33 SC; 307/252 F; 323/22 SC, 22 T, 24

[56] References Cited

UNITED STATES PATENTS

| | | | |
|---|---|---|---|
| 3,217,101 | 11/1965 | Mattingly | 178/7.3 R |
| 3,281,652 | 10/1966 | Perrins | 323/24 |
| 3,365,654 | 1/1968 | Johnston | 323/22 SC |
| 3,633,047 | 1/1972 | Kadah et al. | 307/252 F |
| 3,303,388 | 2/1967 | Means | 317/33 SC |

*Primary Examiner*—Gerald Goldberg
*Attorney*—James S. Nettleton et al.

[57] ABSTRACT

A power supply for use in a television receiver having feedback means providing improved regulation thereof for use as the B+ voltage of the receiver. The feedback signal is taken from the horizontal driver transformer. The power supply is directly connected to the AC power line.

13 Claims, 6 Drawing Figures

T5117

Inventor:—
Erwin J. Dreiske,
By Hofgren, Wegner, Allen, Stellman & McCord
Attys.

TELEVISION RECEIVER CIRCUIT PROVIDING FEEDBACK FROM HORIZONTAL DRIVER TRANSFORMER TO POWER SUPPLY

BACKGROUND OF THE INVENTION

1. Field of the Invention

This invention relates to television control circuits and in particular to power supplies for use therein.

2. Description of the Prior Art

In one conventional form of television receiver, a regulated voltage power supply is provided having a feedback signal delivered thereto from the horizontal output transformer of the receiver. One form of such a circuit is shown in U.S. Pat. No. 3,217,101. In this patent, the pulses from the horizontal output transformer are filtered by an RC network and applied directly to the base of one of the regulating transistors.

In one form of conventional power supply, a silicon controlled rectifier is used as the active regulating element. The silicon controlled rectifier is triggered by a unijunction transistor oscillator circuit. A feedback voltage from the output of the power supply is delivered to the oscillator circuit for regulating the power supply. One form of such a power supply is shown in U.S. Pat. No. 3,221,241.

It is also known in power supplies to provide overload protection means in connection with such regulated power supplies wherein a silicon controlled rectifier is utilized to prevent further supply of power from the regulated power supply in the event the output current exceeds a preselected value. One form of such an overload protected power supply is shown in U.S. Pat. No. 3,303,388.

It is further conventional to provide means for controlling such silicon controlled rectifiers operated in a phase control mode including a programmable unijunction transistor having its cathode connected to the gate of the silicon controlled rectifier, and a ramp and pedestal circuit for triggering the unijunction transistor.

SUMMARY OF THE INVENTION

The present invention comprehends a regulated power supply for use in a television receiver, such as a color television receiver having an improved circuit arrangement whereby the average voltage of the horizontal driver transformer is utilized as a feedback signal to avoid influence of the regulated power supply by manipulation of the receiver controls by the user such as to effect a change in brightness, contrast, color intensity, etc. Thus, the present invention comprehends a circuit arrangement which provides improved regulation in such a television set over the known regulators utilizing feedback signals which vary as a function of the control settings.

The present invention further comprehends such an improved regulated power supply which utilizes an inductively coupled pickup means to avoid ground isolation problems which would otherwise arise where the power supply comprises a transformerless power supply adapted to be connected directly to the AC line voltage. The voltage regulator of the present invention utilizes a series arrangement of a silicon controlled rectifier.

The pickup signal may be obtained by utilizing the horizontal driver transformer eliminating the need for a separate transformer, thereby reducing the cost of the apparatus while yet providing the highly desirable inductive connection. By utilizing a signal from the horizontal driver stage as the means for providing feedback to the voltage regulated power supply, malfunctions in the horizontal output stage may be effectively precluded from shutting down the B+ power supply, thereby facilitating the testing and servicing of the receiver in many instances.

The present invention further comprehends the use of control circuitry providing a feedback signal to the regulated power supply corresponding to the average voltage of the horizontal driver transformer waveform effectively eliminating undesirable variations in the output of the power supply resulting from changes in the control of the television receiver by the user as discussed above.

Thus, more specifically, the invention comprehends the provision of an improved regulated power supply providing a regulated direct current voltage such as for use as the B+ voltage of a television receiver, including a power supply circuit having a voltage regulator, and means for providing a feedback voltage signal from the horizontal driver transformer to control the voltage regulation suitable to provide a regulated power supply output.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
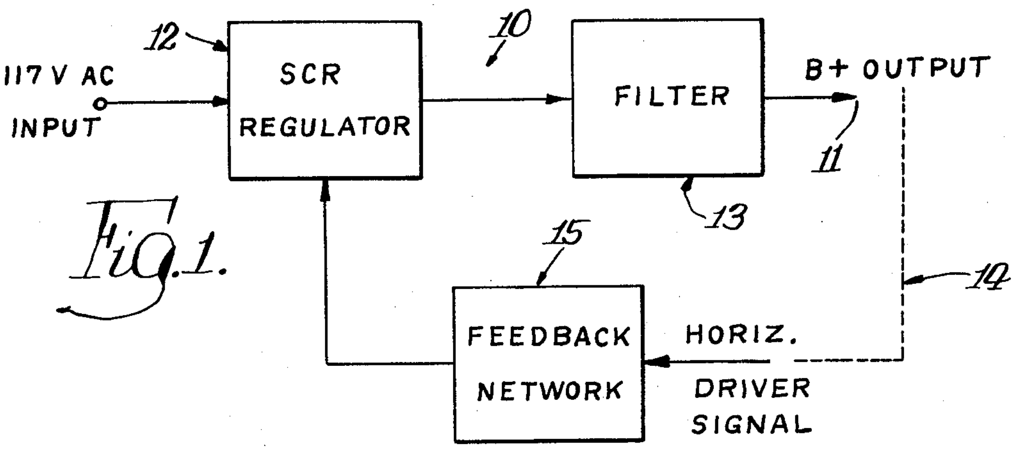
FIG. 1 is a block diagram illustrating the power supply circuitry embodying the invention.

In the exemplary embodiment of the invention as disclosed in the drawing, a power supply generally designated 10 for providing a regulated direct current voltage in an apparatus, such as a television receiver, is shown as providing an output voltage suitable for use as the B+ power supply 11 of the receiver. Power supply 10 includes a regulator portion 12 and a filter portion 13, with a feedback signal 14 being fed to the regulator 12 through a feedback network 15. More specifically, feedback signal 14 comprises a voltage signal obtained from the horizontal driver transformer 16.

Figures 2, 3:
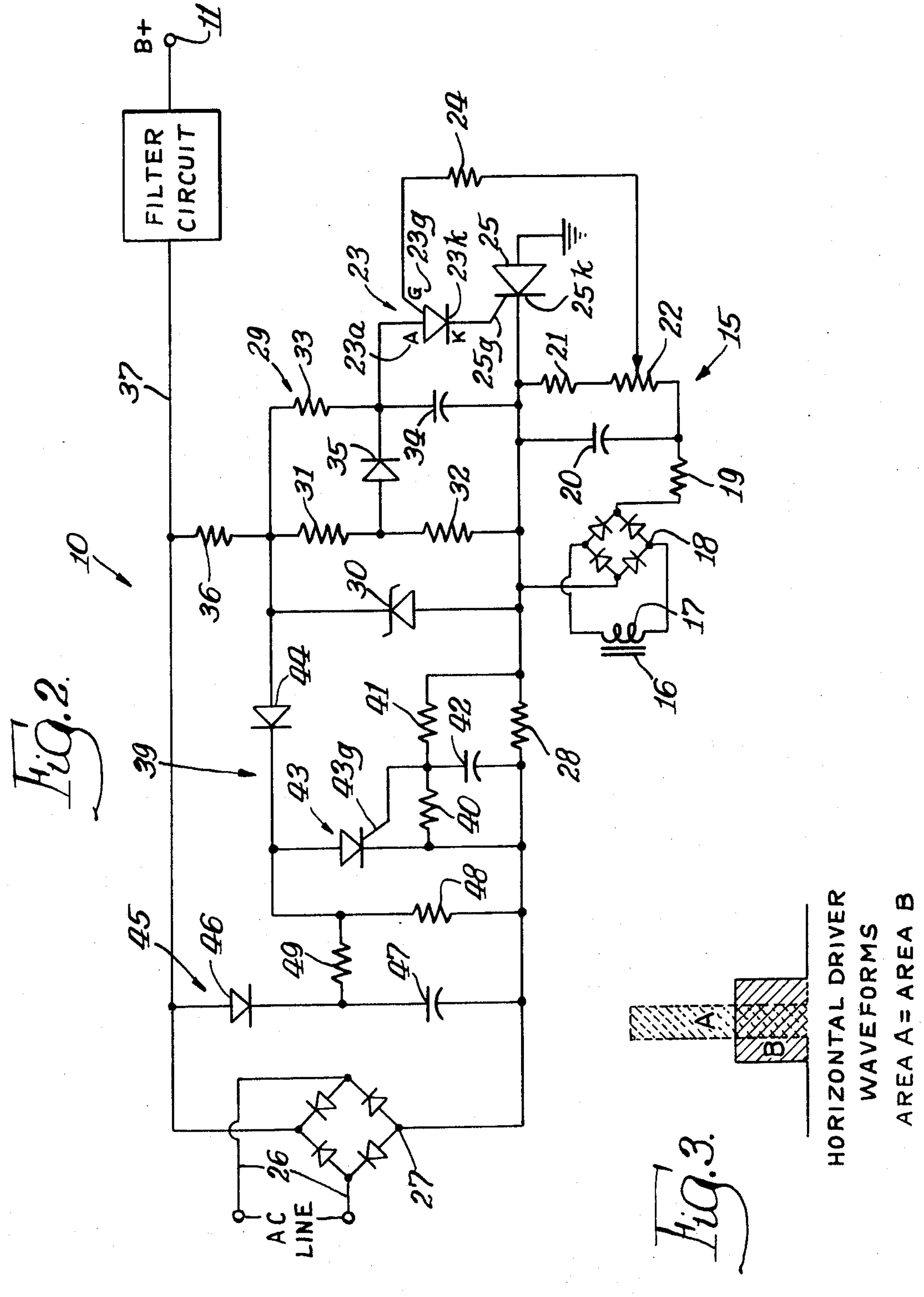
FIG. 2 is a schematic wiring diagram thereof.
FIG. 3 is a waveform diagram illustrating the maintained average voltage value characteristics of the feedback signal.

As shown in FIG. 2, the power supply 10 includes an inductive pickup element associated with the horizontal driver transformer 16 herein comprising a 300 turn coil 17 wound about the core of the horizontal driver transformer. Coil 17 is connected across a bridge rectifier 18. Feedback network 15 includes a resistor 19, a capacitor 20, and a divider resistance network including a fixed resistor 21 and a variable resistor 22 connected in series and in parallel with capacitor 20. The bridge rectifying feedback network 15 develops a direct current voltage at resistor 22 proportional to the average value of the horizontal driver transformer voltage waveform which remains substantially constant regardless of the settings of the television controls, including the brightness, contrast, color intensity, and horizontal hold controls, etc. As shown in FIG. 3, different settings of the horizontal hold control may change the amplitude and duty cycle of the horizontal driver transformer waveform. However, as is obvious to those skilled in the art, the relationship of the width of the voltage wave to the height thereof provides a constant average voltage value so that the signal fed from resistor 22 is effected only by changes in the value of the output supply voltage at terminal 11 and not by the changes in the control settings as discussed above. The full wave rectification and filtering of the waveform obtained from transformer 16 provides such an average voltage output where the RC time constant of resistor 19 and capacitor 20 is less than the period of oscillation of the transformer voltage, which may be approximately 15 kHz.

The feedback signal is applied to the gate **23*g* of a programmable unijunction transistor 23 through a resistor 24 from the variable resistor 22 signal takeoff. The cathode 23*k* of transistor 23 is connected to the gate 25*g* of a silicon controlled rectifier 25 comprising the regulating element of the regulator 12. The power supply to regulator 12 is fed directly from the AC line 26 through a full wave rectifier 27 connected to cathode 25*k* of SCR 25 through a current sensing resistor 28. The opposite side of the rectifier 27 is connected to the filter circuit 13. A ramp and pedestal circuit generally designated 29 is provided by means of a diode 30 connected in parallel with a series connection of resistor 31 and resistor 32 connected in parallel with a series circuit of resistor 33 and capacitor 34 with a diode 35 connected from between resistors 31 and 32 to between resistor 33 and capacitor 34. A resistor 36 is connected between resistors 31 and 33 to the power supply lead 37 connected between bridge circuit 27 and filter circuit 13. The anode 23*a* of transistor 23 is connected also to between resistor 33 and capacitor 34. The ramp and pedestal circuit 29 cooperates with transistor 23 to trigger SCR 25 as a function of the line voltage from input 26** during each half cycle thereof.

In operation, the capacitor 34 is quickly charged through the resistor network defined by resistors 36, 31 and 32 to a voltage below the firing voltage of transistor 23 and subsequently charged at a smaller rate through resistors 36 and 33 to the firing voltage. Diode 30 comprises a suitable Zener diode for maintaining the desired voltage across the control network 29.

Transistor 23 is arranged to be triggered into conduction whenever the voltage at anode **23*a* exceeds the voltage at gate 23*g* by approximately 0.6 v. As the value of the anode voltage is a function of the input line 26 voltage, the firing of transistor 23 is dependent upon the value of voltage delivered to gate 23*g* by the feedback network 15 from the horizontal driver transformer 16. As discussed above, the voltage delivered to gate 23*g*** corresponds to the average voltage of the driver transformer waveform and, thus, is not affected by changes in the brightness, contrast, greater intensity, etc. controls of the television receiver.

Figure 4:
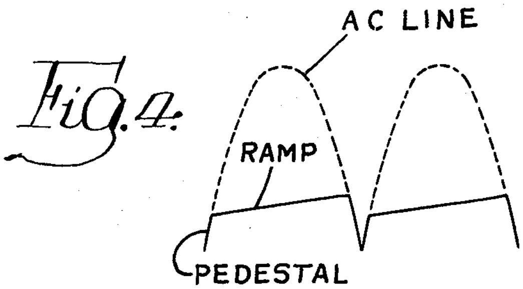
FIG. 4 is a schematic illustration of the ramp and pedestal waveform.
Figures 5, 6:
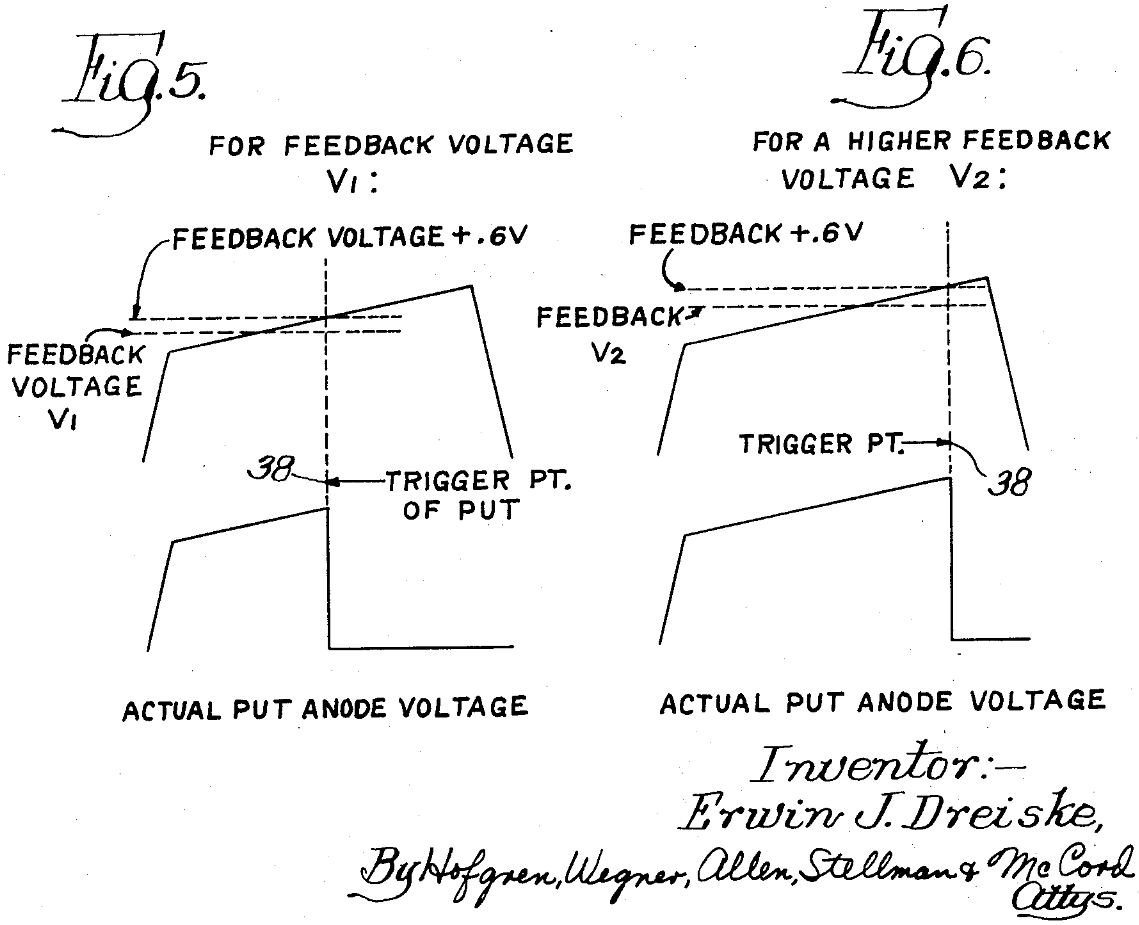
FIG. 5 is a schematic illustration of the voltage waveform of the programmable unijunction transistor anode for one value of feedback voltage.
FIG. 6 is a schematic illustration of the voltage waveform of the programmable unijunction transistor anode for a higher value of feedback voltage.

The control of transistor 23 is illustrated in FIGS. 4, 5 and 6. The production of the ramp and pedestal waveform is illustrated in FIG. 4. As shown in FIGS. 5 and 6, depending on the feedback voltage, the trigger point 38 of the programmable unijunction transistor 23 is shifted by the value of the feedback voltage so as to vary correspondingly the firing of the transistor 23. As indicated above, SCR 25 fires once during each half cycle of the AC line voltage 26 when the charge on capacitor 34 reaches a voltage 0.6 v. higher than the voltage delivered to gate **23*g*. Upon firing of the transistor 23, capacitor 34 discharges through the transistor and gate 25*g*** of the SCR to provide the phase controlled operation of the voltage regulator.

As indicated briefly above, it is further desirable to prevent damage to the regulator by limiting the current output thereof. To this end, protective circuitry 39 is incorporated in regulator 10 to shut down the SCR 25 whenever the average current delivered to B+ terminal 11 exceeds a preselected value. Protective circuit 39 includes the resistor 28, and a network including resistors 40 and 41 and capacitor 42. A common connection between resistors 40 and 41 and capacitor 42 is connected to the gate **43*g* of a second SCR 43 to provide a voltage thereto proportional to the average voltage developed across resistor 28. SCR 43 is connected across the ramp and pedestal circuit through a diode 44. Diode 44 is reverse biased during normal power supply operation, effectively isolating the protective circuit 39 from the ramp and pedestal circuit 29. When SCR 43 is triggered into conduction by the voltage developed across resistor 28, it shunts the triggering circuit 29 for SCR 25 thereby preventing further operation of SCR 25. A holding current circuit 45 is provided for maintaining the circuit to SCR 43 including a series connected diode 46 and capacitor 47 and a resistor 48 connected in parallel with SCR 43. A resistor 49 is connected between the connection of diode 46 and capacitor 47 to the connection between SCR 43 and diode 44 providing a circuit for maintaining SCR 43** conducting once it has been triggered as discussed above.

SCR 25 remains deactivated until such time as the current through SCR 43 is interrupted. Such interruption is effected by opening the power supply 26 for a sufficient time to permit capacitor 47 to discharge. In the conventional television circuit, such functioning would be effected by the user turning the set off for the preselected period of time.

Further, circuit 13 may comprise any suitable filter circuit as will be obvious to those skilled in the art. Illustratively, the filter circuit may comprise a conventional LC circuit or an electronic filter circuit including a power transistor and RC network.

Thus, voltage regulated power supply 10 provides an improved power supply such as for use as the B+ power supply of a color television set in maintaining the desired voltage notwithstanding changes made in the setting of the set by the user which affect conventional regulated voltage supplies adversely such as where the feedback signal thereto is taken from the output of the horizontal deflection stage. By utilization of the inductive, transformer coupled feedback, ground isolation problems are avoided in regulator 10 thereby eliminating the need for complex feedback circuitry while permitting the regulator to be extremely simple and economical of construction as a transformerless power supply using a series SCR regulated means.

As the feedback signal is taken prior to the horizontal deflection circuit output, malfunctions in such output circuitry do not affect the provision of the B+ power supply, thus permitting testing and servicing of the portion of the receiver prior to the horizontal output circuitry thereby facilitating such servicing.

One illustrative example of construction of voltage regulator 10 utilizes the following component values:

| | | | |
|---|---|---|---|
| Resistor 28 | 0.5Ω,7W | Capacitor 34 | 0.01 mfd. |
| Resistor 36 | 10K, 2W | Capacitor 20 | 0.05 mfd. |
| Resistor 31 | 1K | Capacitor 42 | 200 mfd. |
| REsistor 32 | 10K | Capacitor 47 | 2 mfd. |
| Resistor 33 | 470K | Zener Diode 30 | 16V, 1W |
| Resistor 19 | 2.2K | SCR 25 | 2N4443 |
| Resistor 22 | 5K | SCR 43 | Unitrode 1D-100 |
| Resistor 21 | 5.6K | Programmable 23 Unijunction Transistor | 2N6027 |
| Resistor 24 | 22K | | |
| Resistor 40 | 820Ω | | |
| Resistor 41 | 1K | | |
| Resistor 49 | 33K 1W | | |
| Resistor 48 | 3.9K | | |

The foregoing disclosure of specific embodiments is illustrative of the broad inventive concepts comprehended by the invention.

I claim:

1. In a television receiver having a horizontal deflection circuit section including an output portion and an input portion having a horizontal driver transformer, a power supply providing a regulated direct current voltage such as for use as the B+ voltage of the receiver, comprising: a B+ power supply circuit having a voltage regulator; and means for providing a feedback voltage signal from the horizontal driver transformer to control the voltage regulator suitably to provide a regulated output B+ power supply.

2. The power supply of claim 1 wherein said means for providing said feedback voltage comprises means inductively coupled to said horizontal driver transformer.

3. The power supply of claim 1 wherein said means for providing said feedback voltage comprises means for providing a DC voltage proportional to the average value of the horizontal driver transformer voltage waveform.

4. The power supply of claim 1 wherein said means for providing said feedback voltage comprises means inductively coupled to said horizontal driver transformer, a rectifier network, and an RC network connected in series for providing a DC voltage proportional to the average value of the horizontal driver transformer voltage waveform.

5. The power supply of claim 1 wherein said means for providing said feedback voltage comprises a voltage pickup coil wound about the core of the horizontal driver transformer.

6. The power supply of claim 1 wherein said B+ power supply circuit includes an output filter.

7. The power supply of claim 1 wherein said B+ power supply is arranged to operate at conventional power line voltage.

8. In a television receiver having a horizontal deflection circuit section including an output portion and an input portion having a horizontal driver transformer, a power supply providing a regulated direct current voltage such as for use as the B+ voltage of the receiver, comprising: a power supply circuit having a silicon controlled rectifier; and means for providing a feedback voltage signal from the horizontal driver transformer to control the silicon controlled rectifier suitably to provide a regulated output power supply.

9. The power supply of claim 8 wherein said power supply circuit includes means for controlling the silicon controlled rectifier in a phase control mode as a function of the feedback signal.

10. The power supply of claim 8 wherein said power supply circuit comprises a capacitor, means for cyclically charging the capacitor as a function of the horizontal driver transformer voltage, and a transistor controlling the gate of the silicon controlled rectifier and fired by said capacitor.

11. The power supply of claim 10 wherein said power supply circuit comprises means for shifting the triggering point of said transistor as a function of the charge of the capacitor thereby to vary the firing angle of said silicon controlled rectifier as a function of the feedback voltage signal.

12. The power supply of claim 8 wherein said power supply circuit comprises a capacitor, means for cyclically charging the capacitor as a function of the AC line voltage, and a programmable unijunction transistor controlling the gate of the silicon controlled rectifier and fired by said capacitor, said power supply circuit comprising means for shifting the triggering point of said transistor as a function of the charge of the capacitor thereby to vary the firing angle of said silicon controlled rectifier as a function of the feedback voltage signal, said means for providing a feedback signal full wave rectifying means and filter means having a time constant less than the period of oscillation of the horizontal driver transformer current for providing a feedback signal corresponding to the average voltage of the transformer current waveform.

13. The power supply of claim 8 further including means for preventing triggering of said silicon controlled rectifier in the event the current drawn from the power supply exceeds a preselected value.

* * * * *